US006819259B2

(12) United States Patent
Yamaguchi

(10) Patent No.: US 6,819,259 B2
(45) Date of Patent: Nov. 16, 2004

(54) REMOTE CONTROL SYSTEM AND TIMING METHOD FOR OPERATION THEREOF

(75) Inventor: Takashi Yamaguchi, Tokyo (JP)

(73) Assignee: Konami Corporation, Tokyo (JP)

(*) Notice: Subject to any disclaimer, the term of this patent is extended or adjusted under 35 U.S.C. 154(b) by 367 days.

(21) Appl. No.: 09/989,290

(22) Filed: Nov. 20, 2001

(65) Prior Publication Data

US 2002/0109606 A1 Aug. 15, 2002

(30) Foreign Application Priority Data

Feb. 9, 2001 (JP) ........................................ 2001-34042

(51) Int. Cl.[7] ........................ G08C 19/00; G05B 23/02; H04Q 5/22; H04J 3/00; H04B 7/212

(52) U.S. Cl. ................................ 340/825.69; 340/3.21; 340/10.2; 340/825.72; 370/345; 370/347; 370/348; 463/39

(58) Field of Search ........................... 340/10.2, 825.69, 340/825.72, 3.21; 370/294, 314, 345, 347, 348; 463/39; 446/456

(56) References Cited

U.S. PATENT DOCUMENTS 4,137,522 A 1/1979 Stein
6,346,047 B1 * 2/2002 Sobota et al. ................. 463/39
6,661,351 B1 * 12/2003 Matsushiro ............ 340/825.69

FOREIGN PATENT DOCUMENTS

| | | |
|---|---|---|
| DE | 23 62 765 | 6/1975 |
| DE | 24 49 660 | 4/1976 |

* cited by examiner

*Primary Examiner*—Brian Zimmerman
*Assistant Examiner*—Clara Yang
(74) *Attorney, Agent, or Firm*—Jordan and Hamburg LLP

(57) ABSTRACT

The present invention provides a system for remote control of a plurality of driving apparatuses with transmitters. Each transmitter includes: a data transmission device for transmitting data including identification information peculiar to each transmitter and control information for controlling a driving apparatus; a reception device for receiving data transmitted from other transmitters; a timing setup device for setting a self-data transmission timing based on the identification information included in the received data; and a transmission control device for controlling the data transmission time according to the set timing. Each driving apparatus includes: a reception device for receiving transmission data from each transmitter; and a control device for comparing the identification information in the received data with self-identification information, and deciding whether the received data is a data transmitted to the self when a positive comparison is made, and carrying out an operation control based on the received data is transmitted to the self.

19 Claims, 8 Drawing Sheets

REMOTE CONTROL SYSTEM AND TIMING METHOD FOR OPERATION THEREOF

BACKGROUND OF THE INVENTION

1. Field of the Invention

The present invention relates to a system for carrying out remote control with respect to driving apparatuses such as automobiles and robots, and in particular, to a remote control system, which is suitable in the case where there is a need of simultaneously controlling a plurality of driving apparatuses at the same place.

2. Description of the Related Art

In the case of carrying out remote control with respect to a plurality of driving apparatuses at the same place using an infrared ray or radio wave, a signal from each transmitter provided correspondingly to these driving apparatuses interferes with each other; for this reason, a problem arises such that no accurate control is carried out. As technique for solving the above problem, a system disclosed in Japanese Patent No. 2625617 has been known. In the system, different identification data is set with respect to a plurality of transmitters, and the same identification data as the corresponding transmitter is set with respect to each receiver. A transmission data from each transmitter is composed of combining a data section equivalent to actual control information, a unit data section comprising a space section having a time length more than a transmission time of the data section, and a wait section having a time length more than the unit data section. In accordance with the identification data allocated to each transmitter, the combination of the unit data section and the wait section is changed. By doing so, it is possible to produce a state such that the data section transmitted from each transmitter does not overlap with each other.

The above remote control system does not carry out a control for synchronizing a transmission timing of data from each transmitter, and each transmitter transmits data according to a transmission pattern in response to the self-identification data. For this reason, when the number of transmitters increases, a frequency that the transmission timing of data from each transmitter overlaps with each other increases, while a probability that data is transmitted from only one transmitter decreases. As a result, a problem arises such that each driving apparatus is not smoothly controlled. In particular, in the case where it is required to continue to operate many driving apparatuses, the above confusion arises at a high probability.

SUMMARY OF THE INVENTION

Accordingly, an object of the present invention is to provide a remote control system, which can smoothly carry out remote control with respect to a plurality of driving apparatuses at the same place.

In order to solve the above problem and to achieve the above object, the present invention provides a remote control system, which independently operates a plurality of driving apparatuses by remote control using a plurality of transmitters prepared so as to correspond to the driving apparatuses. Each of the plurality of transmitters comprising: a data transmission device for transmitting data including identification information peculiar to each transmitter for identifying each transmitter and control information for controlling the driving apparatuses; a reception device for receiving data transmitted from other transmitters; a timing setup device for setting a self-data transmission timing based on the identification information included in the received data; and a transmission control device for making the data transmission device transmit the data according to the set timing. Each of the plurality of driving apparatuses comprising: a reception device for receiving transmission data from each transmitter; and a control device for comparing the identification information included in the received data with an allocated self identification information, and making a decision whether or not the received data is a data transmitted to the self, and further, carrying out an operation control based on the data when the data is transmitted to the self.

According to the remote control system of the present invention, each transmitter can receive data transmitted from other transmitters, so that the data transmission timing can be adjusted between transmitters. As a result, the transmission timing of data from each transmitter is set so as to be mutually shifted, and therefore, it is possible to prevent data interference. By doing so, even in the case where a plurality of transmitters is simultaneously used, it is possible to smoothly operate the driving apparatus corresponding to each transmitter by remote control.

In the present invention, various mobile elements such as vehicles, robots, and animal type toys and the like are included as the driving apparatuses. The present invention is applicable to the case where mutually different portions of single object are operated as mutually different driving apparatuses by remote control using a plurality of transmitters. In this case, the following transmitter is used; more specifically, a transmitter, which transmits a control signal or the like by using various transmission waves such as an infrared ray and a radio wave and the like, can be used as the transmitter of the present invention. An identification number can be used as the identification information allocated to the transmitter and the driving apparatus.

Further, the remote control system of the present invention may include the following preferred embodiments.

A period when each transmitter is allowed to transmit a data is predetermined so as not to overlap with each other in a predetermined cycle based on the identification information allocated to each transmitter, the timing setup device specifies, when receiving data transmitted from other transmitters, a time remaining until the self-data transmission timing comes in the cycle based on the identification information included in the receiving data, and the transmission control device makes the data transmission device start the data transmission when the specified time elapses.

By doing so, each transmitter can specify the self-data transmission timing when each transmitter should transmit the self data by referring to the data transmission from other transmitter. In addition, the data transmission of each transmitter is carried out every predetermined cycle; therefore, even if one transmitter interrupts data transmission on the midway, the remaining transmitter can transmit data for the period allocated to the self at the transmission timing allocated to the self.

The period when each transmitter is allowed to transmit the data in the predetermined cycle may be set to mutually equal time with respect to each transmitter. By doing so, the sequence of data transmission of each transmitter in the predetermined cycle is merely predetermined, and thereby, each transmitter can specify a period for transmitting the self-data. More specifically, if a time of the transmission period given to each transmitter is set as T, when data transmission is started from the transmitter having the first transmission sequence, the transmitter having the next transmission sequence starts data transmission after time T elapses, and further, the transmitter having the next transmission sequence starts data transmission after time 2T elapses. As described above, transmission start timing of one transmitter is found, and thereby, it is possible to readily specify transmission timing from transmission sequence and time allocated to each transmitter.

The timing setup device may set transmission timing of the data so that the self data transmission device repeats data transmission in the predetermined cycle in the case where it can not receive data from other transmitters. In this case, even in a state that data transmission from all transmitters excluding the self is stopped, it is possible to repeatedly transmit data from the transmitter itself at correct timing.

Each transmitter may include a hold device, which makes a decision whether or not the identification information included in the data transmitted from other transmitter is the same as the identification information set to the self, and holds, in the case where a decision is made such that both information are the same, a transmission timing setup by the timing setup device until receiving data including an identification information different from the self-identification information. In this case, it is possible to prevent interference in the case where identification information overlaps with each other between the plurality of transmitters.

Each transmitter may include a transmission data confirming device, which compares a data transmitted at the timing set by the timing setup device with a data received concurrently with the transmission, and makes the hold device carry out a procedure when both data are not correspondent. In this case, interference is detected as the result that data is simultaneously transmitted from other transmitters, and thereby, it is possible to adjust data transmission timing so that no interference is again generated.

Further, the present invention provides a transmitter for remote control system, which is prepared for each of driving apparatuses to independently operate the driving apparatuses by remote control, comprising: a data transmission device for transmitting data including identification information peculiar to the transmitter and control information for controlling the driving apparatus; a reception device for receiving data transmitted from other transmitters; a timing setup device for setting a self-data transmission timing based on the identification information included in the received data; and a transmission control device for making the data transmission device transmit the data according to the set timing.

The transmitter is prepared for each driving apparatus, and then, the same identification information is set to the paired driving apparatus and transmitter so that each driving apparatus is controlled based on the data including the same identification information, and thereby, the remote control system of the present invention is constructed.

The transmitter of the present invention may include various preferred embodiments in the above remote control system. More specifically, a period when the transmitter is allowed to transmit a data is predetermined in a predetermined cycle based on the identification information, the timing setup device specifies, when receiving data transmitted from other transmitters, a time remaining until the self-data transmission timing comes in the cycle based on the identification information included in the receiving data, and the transmission control device makes the data transmission device start the data transmission when the specified time elapses. Further, the period when the transmitter is allowed to transmit the data in the predetermined cycle may be set to a time equal to time transmitting data with respect to other transmitters. Furthermore, the timing setup device may set transmission timing of the data so that the self data transmission device repeats data transmission in the predetermined cycle in the case where it cannot receive data from other transmitters. The transmitter may further include a hold device, which makes a decision whether or not the identification information included in the data transmitted from other transmitter is the same as the identification information set to the self, and holds, in the case where a decision is made such that both information are the same, a transmission timing setup by the timing setup device until receiving data including an identification information different from the self-identification information. The transmitter may further include a transmission data confirming device, which compares a data transmitted at the timing set by the timing setup device with a data received concurrently with the transmission, and makes the hold device carry out a procedure when both data are not correspondent.

Further, the present invention provides a remote control system program used for a transmitter, which includes a data transmission device for transmitting data including identification information peculiar to the transmitter and control information for controlling the driving apparatus, a reception device for receiving data transmitted from other transmitters, and a computer for controlling data transmission based on the received data, and which is prepared for each of driving apparatuses to independently operate the driving apparatuses by remote control, the program being constructed to allow the computer to serve as: a timing setup device for setting a self-data transmission timing based on the identification information included in the data received by the reception device; and a transmission control device for making the data transmission device transmit the data according to the set timing.

The computer of the transmitter reads and executes the program, and thereby, the transmitter of the present invention is constructed.

The program of the present invention may include various preferred embodiments in the above remote control system. More specifically, a period when the transmitter is allowed to transmit a data is predetermined in a predetermined cycle based on the identification information, the timing setup device specifies, when receiving data transmitted from other transmitters, a time remaining until the self-data transmission timing comes in the cycle based on the identification information included in the receiving data, and the transmission control device makes the data transmission device start the data transmission when the specified time elapses. Further, the period when the transmitter is allowed to transmit the data in the predetermined cycle may set to a time equal to time transmitting data with respect to other transmitters. Furthermore, the timing setup device may set transmission timing of the data so that the self data transmission device repeats data transmission in the predetermined cycle in the case where it can not receive data from other transmitters. The program may being constructed to allow the computer to serve further as a hold device, which makes a decision whether or not the identification information included in the data transmitted from other transmitter is the same as the identification information set to the self, and holds, in the case where a decision is made such that both information are the same, a transmission timing setup by the timing setup device until receiving data including an identification information different from the self-identification information. The program may being constructed to allow the computer to serve further as a transmission data confirming device, which compares a data transmitted at the timing set by the timing setup device with a data received concurrently with the transmission, and makes the hold device carry out a procedure when both data are not correspondent.

Further, the program of the present invention may be provided through a computer readable storage medium.

BRIEF DESCRIPTION OF THE DRAWINGS

FIG. 7 is a flowchart showing a procedure of power-on operation executed by a control circuit of transmitter until self-data transmission start from power-on.

DETAILED DESCRIPTION OF THE PREFERRED EMBODIMENTS

Figure 1:
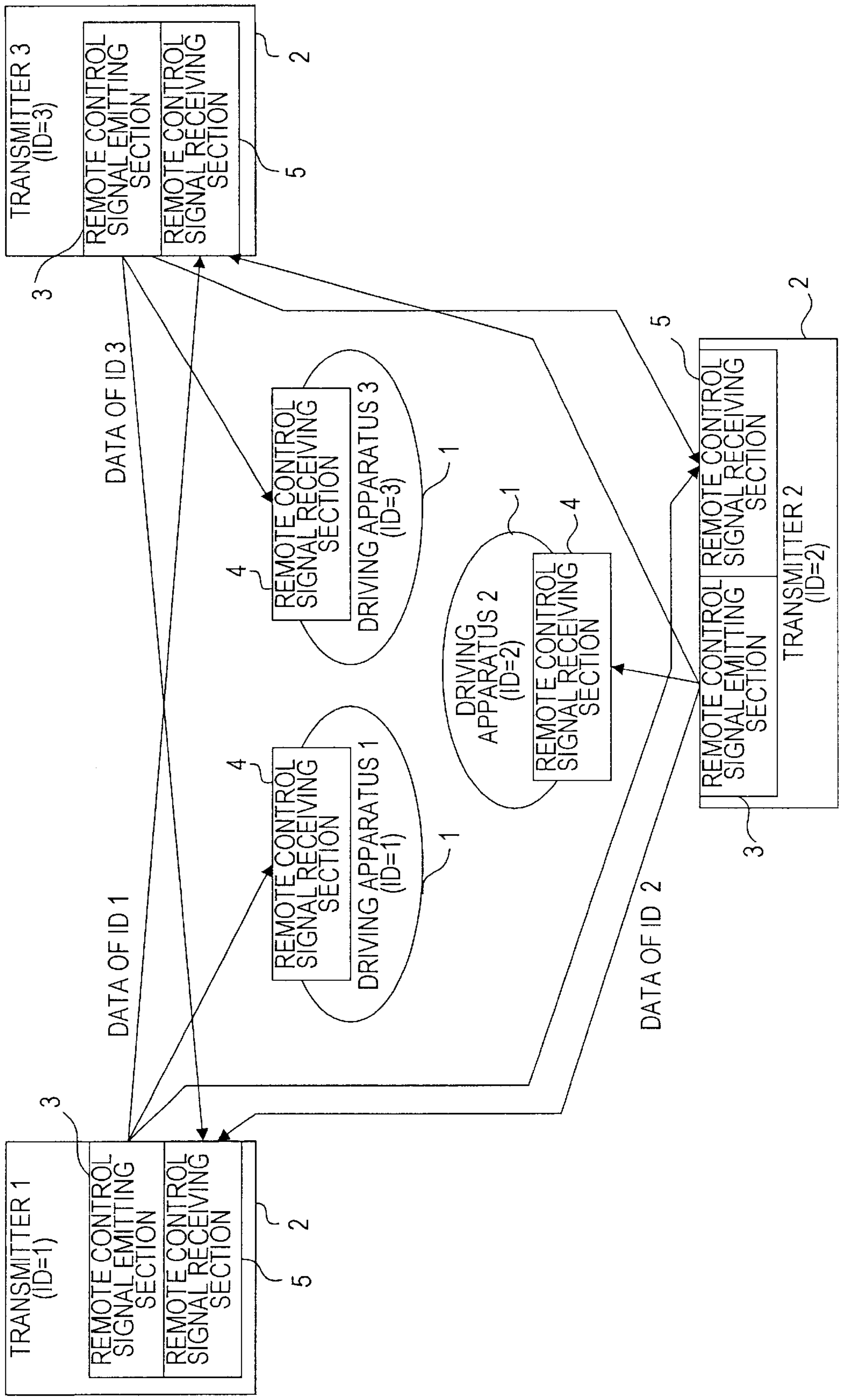
FIG. 1 is a view showing a schematic configuration of remote control system according to the present invention.

FIG. 1 is a view showing a schematic configuration of remote control system according to the present invention. In FIG. 1, there is shown the case where remote control is carried out with respect to three driving apparatuses 1 . . . 1 at the same place.

A transmitter 2 . . . 2 is prepared so as to make one-to-one correspondence to each driving apparatus 1. Numbers 1 to 3 are given as identification number (ID) to these driving apparatuses 1 . . . 1 and transmitters 2 . . . 2. The driving apparatus 1 and the transmitter 2 having the same identification number form a pair, and each driving apparatus 1 is operated by remote control based on a data from the transmitter 2 having the same identification number. An infrared ray is used in the remote control operation of each driving apparatus 1. Thus, each transmitter 2 is provided with a remote control signal emitting section (unit) 3; on the other hand, each driving apparatus 1 is provided with a remote control signal receiving section 4. Further, in order to take synchronization of data transmission from each transmitter 2, each transmitter 2 is provided with a remote control signal receiving section 5.

Figure 2:
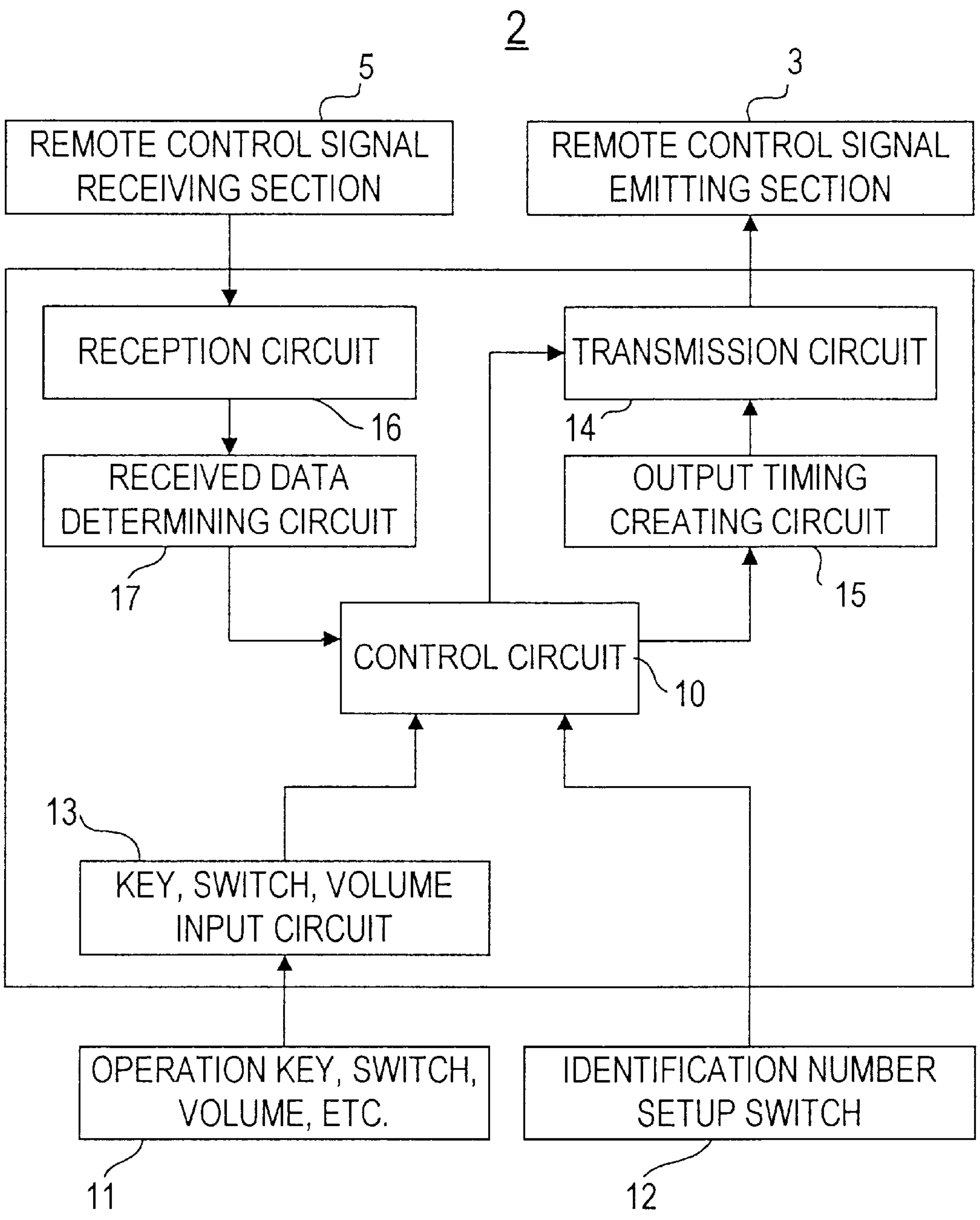
FIG. 2 is a view showing a circuit configuration of transmitter.

FIG. 2 is a view showing a circuit configuration of the transmitter 2. The transmitter 2 is provided with the above remote control signal emitting and receiving sections 3 and 5. Further, the transmitter 2 is provided with a control circuit 10 for generating a transmission data and controlling other circuits, an input device 11 such as operation key, switch or volume for controlling an operation of the driving apparatus 1, and a switch 12 for setting an identification number. The operating state of the input device 11 by an operator is detected by an input circuit 13, and an operation signal in response to the operating state of the input device 11 is inputted from the input circuit 13 to the control circuit 10. The identification number set by an identification number setting switch 12 is read by the control circuit 10. In this case, the identification number set by the identification setting switch 12 may be arbitrarily selected from a range predetermined by an operator or system administrator and the like, or may be fixed to a specified number predetermined by a manufacturer of the transmitter 2.

The remote control signal emitting section 3 includes a light emitting device, for example, such as an LED or the like, and emits an infrared ray in response to an instruction from a transmission circuit 14. The transmission circuit 14 outputs a transmission data to the remote control signal emitting section 3 according to a timing instructed from an output timing creating circuit 15. The data outputted to the remote control signal emitting section 3 is generated by the control circuit 10, and the transmission circuit 14 modulates the data generated by the control circuit 10 by a remote control signal carrier signal so as to drive the remote control signal emitting section 3. The output timing creating circuit 15 counts time according to a timer setup value given from the control circuit 10, and then, outputs a transmission instruction when a time corresponding to the timer setup value elapses. A frequency of the infrared carrier signal outputted from the remote control signal emitting section 3 is the same in all transmitters 2.

Figure 3:
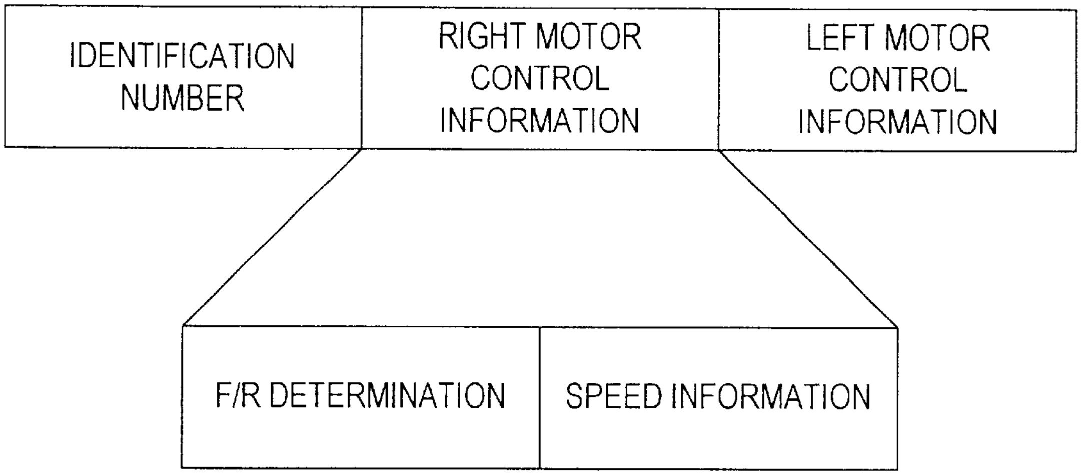
FIG. 3 is a view showing a remote control data structure of one block outputted from a transmitter.

On the other hand, the remote control signal receiving section 5 receives an infrared ray transmitted from other transmitters 2, and then, outputs a signal eliminating a carrier component from the received infrared ray to a reception circuit 16. The reception circuit 16 decodes the signal given from the remote control signal receiving section 5 into one block remote control data, and thereafter, outputs the data to a received data determining circuit 17. In this case, the one block remote control data is composed of an identification number and control information on a pair of right and left motors (motor 28; 28 shown in FIG. 4) provided in the driving apparatus 1, as shown in FIG. 3. The control information on right and left motors is composed of information (F/R determination) for determining which the rotational direction of each motor is forward or rearward direction and information for specifying a driving speed of motor. The bit number of one block remote control data is always constant. Thus, time spent for transmitting one block remote control data is constant.

The received data determining circuit 17 determines an identification number of received data given from the reception circuit 16, and thereafter, supplies the determination result to the control circuit 10. Then, the control circuit 10 controls the operation of the transmission circuit 14 and the output timing creating circuit 15 based on information given from the received data determining circuit 17, the identification number setup switch 12 and the input circuit 13. Further, the control circuit 10 makes a decision as to whether or not interference is made and sets an output timing when the self-transmission data is to be transmitted, based on the identification number of received data given from the received data determining circuit 17 and the self-identification number set by the identification number setup switch 12. Subsequently, the control circuit 10 sets a timer setup value with respect to the output timing creating circuit 15 in accordance with the set output timing. Further, the control circuit 10 generates a transmission data to the driving apparatus 1 having the same identification number as the self-identification number based on information given from the identification number setup switch 12 and the input circuit 13, and thereafter, outputs the transmission data to the transmission circuit 14.

In addition, the control circuit 10 is connected with a power switch and the like; however, these elements are omitted. Moreover, one transmitter 2 may be provided with two or more remote control signal receiving sections 5 having different detection direction. The control circuit 10 may be composed of combining a microcomputer and a predetermined program. The transmission circuit 14, output timing creating circuit 15, reception circuit 16 and received data determining circuit 17 may be composed as a logical circuit, and may be composed of combining a microcomputer and a predetermined program like the control circuit 10. At least any one of the output timing creating circuit 15 and the received data determining circuit 17 may be integrated with the control circuit 10.

Figure 4A:
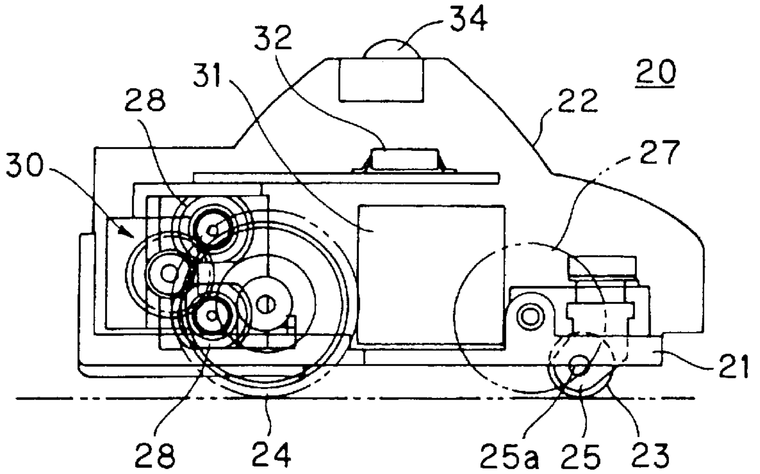
FIG. 4 is a view showing an automobile model as one embodiment of driving apparatuses.
Figure 4B:
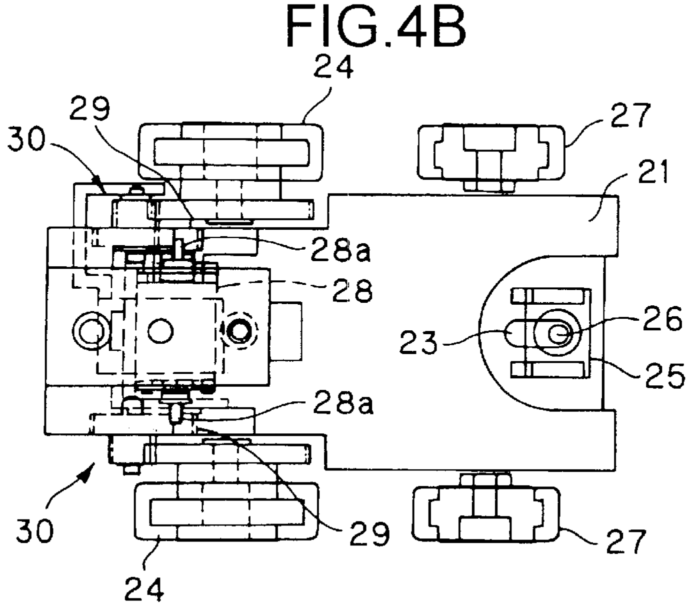
Figure 4C:
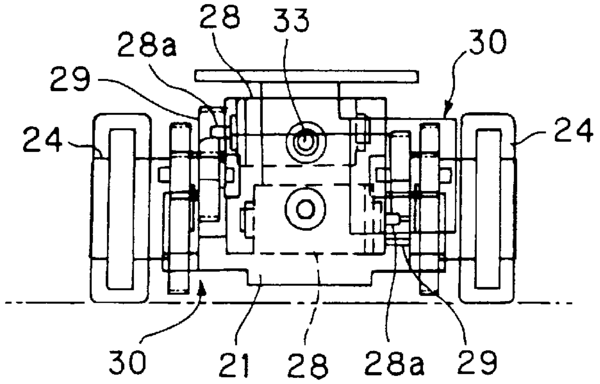

FIG. 4 is a view showing an automobile model as one embodiment of driving apparatuses 1. FIG. 4(*a*) is a side view of the automobile model, FIG. 4(*b*) is a bottom view thereof, and FIG. 4(*c*) is a rear view thereof. In this case, the driving apparatus 1 comprises an automobile model 20. The automobile model 20 has a chassis 21, and a body 22 covering the upper portion of the chassis. The chassis 21 is provided with a front wheel 23 on the center at its front portion, and is provided with a pair of right and left rear wheels 24 and 24 at its rear portion. The front wheel 23 is rotatably attached to a support beam 25 via an axle 25*a*. The support beam 25 is mounted so as to be rotatable around a turning shaft 26 vertical to the chassis 21. By doing so, the front wheel 23 is freely rotatable around the turning shaft 26 in a range of 360°. In this case, the chassis 21 is attached with dummy wheels 27 and 27 on the right and left sides of the front portion. However, these dummy wheels 27 are floating, and thus, the chassis 21 is supported by the front wheel 23 and the rear wheels 24 and 24.

The rear portion of the chassis 21 is provided with motors 28 and 28, which are vertically overlapped with each other. Each motor 28 is provided in order to drive the rear wheel 28 independently. An output shaft 28*a* of each motor 28 is attached with a pinion 29, and the rotation of the pinion 29 is transmitted via a gear train 30 to the rear wheel 24, which is a driving object. In the manner as described above, right and left rear wheels 24 and 24 are independently driven by each motor 28. Therefore, a rotational speed of the motors 28 and 28 is changed in right and left motor, and only one motor 28 is driven, or the motors 28 and 28 are rotated to a direction different from each other, and by doing so, various turning motions can be given to the automobile model 20.

At the front portion of the motor 28, there is mounted a battery 31, and a control unit 32 comprising, for example, a one-chip microcomputer is provided above the battery 31. The rear portion of the chassis 21 is provided with an LED 33 for making a decision whether or not power is turned on. Further, the upper central portion of the body 22 is provided with a remote control signal receiving section 34 for receiving an infrared ray from the transmitter 2.

Figure 5:
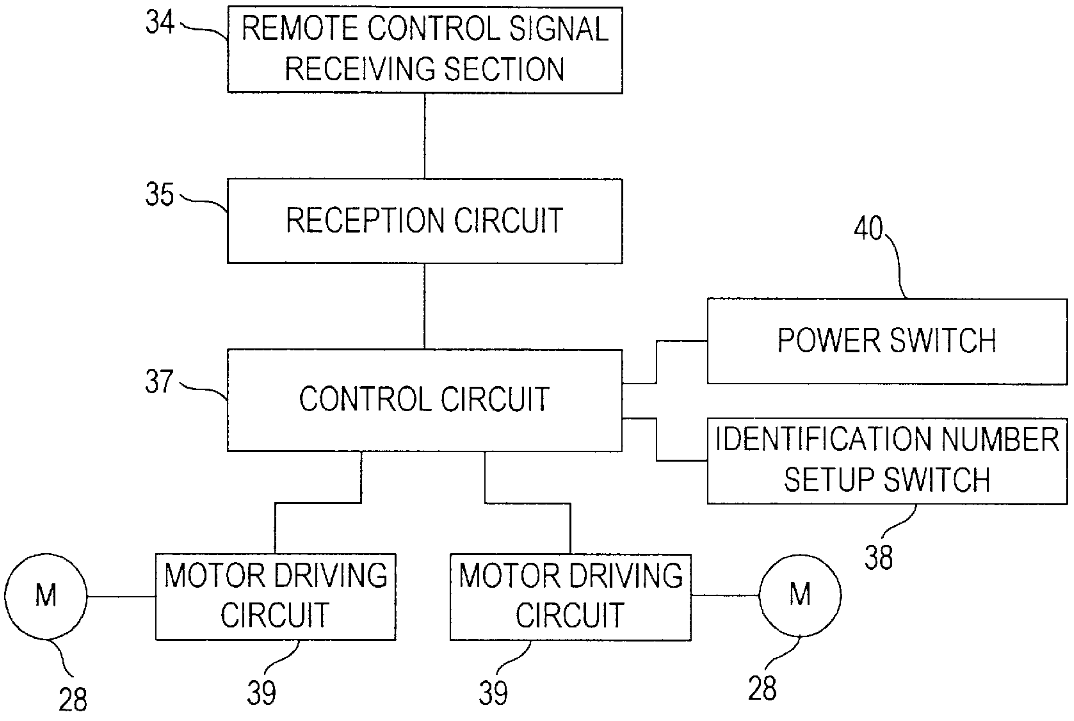
FIG. 5 is a view showing a circuit configuration of control system mounted in the automobile model.

FIG. 5 shows a circuit configuration of control system mounted into the automobile model 20. The automobile model 20 is provided with the aforesaid remote control signal receiving section 34. The remote control signal receiving section 34 receives an infrared ray transmitted from the transmitter 2, and then, outputs a signal eliminating a carrier component from the received infrared ray to a reception circuit 35. The reception circuit 35 decodes a signal given from the remote control signal receiving section 34 into one block remote control data, and then, outputs the data to a control circuit 37. The one block remote control data is as shown in FIG. 3. The control circuit 37 determines an identification number of received data given from the reception circuit 35, and then, compares the identification number with the identification number set by a identification number setup switch 38, and thereafter, makes a decision whether the remote control data is valid or invalid. More specifically, if the identification number is not correspondent, the control circuit 37 makes a decision that the received remote control data is invalid, and thus, generates no driving signal of the motor 28. On the other hand, if the identification number is correspondent, the control circuit 37 determines a rotating direction and a rotational speed of the motor 28 based on motor control information of the remote control data given from the reception circuit 35. Thereafter, the control circuit 37 outputs a motor driving signal in response to the determined value to motor driving circuits 39 and 39. Each motor driving circuit 39 controls a rotation of the motor 28 based on the given motor driving signal. In this case, the identification number setup switch 38 may be designed such that an operator, a system manager or the like can select any number from a predetermined range, or a manufacturer of the transmitter 2 may previously fix the identification number at a specific number. Moreover, the control circuit 37 is connected with a power switch 40. The battery 31 and the LED 33 shown in FIG. 4 are omitted in FIG. 5.

In the automobile model 20 as described above, in the case where the remote control data is simultaneously transmitted from tow two transmitters 2 or more and the remote control data identification number of one transmitter coincides with that of the automobile model 20, the control circuit 37 regards the remote control data received at that time as valid. For this reason, the motor control information interferes with control information from another transmitter 2 having different identification number; as a result, there is a possibility that the motor 28 is erroneously controlled. In order to avoid the above disadvantage, in the remote control system of this embodiment, each transmitter 2 specifies self-transmission timing while receiving a remote control signal transmitted from other transmitters. By doing so, the transmission timing is synchronized so that the transmission timing of each transmitter 2 does not overlap with each other. The following is a description on this point.

Figure 6:
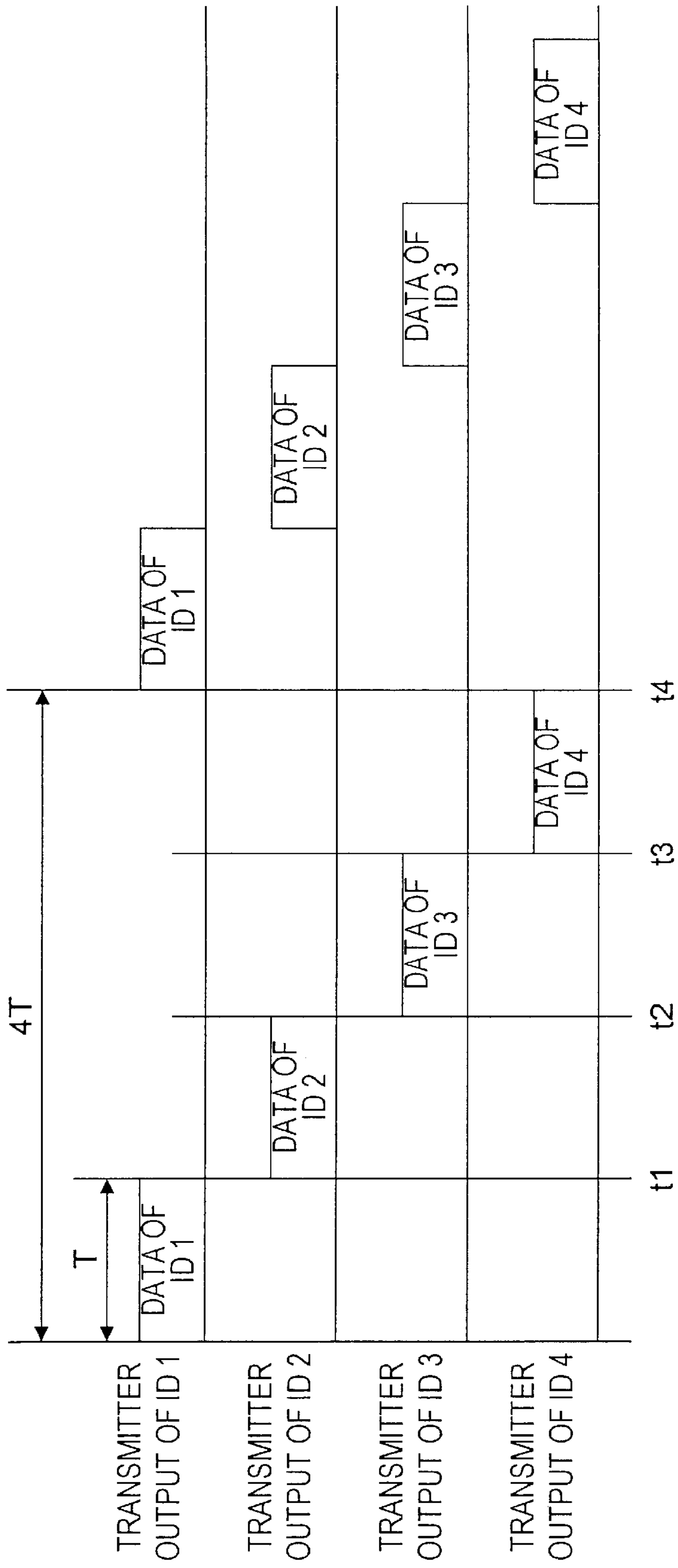
FIG. 6 is a view showing the way to take transmission timing in the case where four transmitters are simultaneously used.

FIG. 6 is a view showing the way to take transmission timing in the case where four transmitters 2 are simultaneously used. In FIG. 6, a transmission time of remote control signal transmitted by one transmitter 2 is T, and thus, each transmitter 2 repeats a remote control signal transmission at a cycle (period) equivalent to 4T (=number of transmitters 2×transmission time T). Moreover, the transmission timing of each transmitter 2 is shifted by T in succession from the identification number 1. According to the above relation, each transmitter 2 controls the transmission timing, and thereby, it is possible to prevent the transmission timings from four transmitters 2 from overlapping with each other. In order to realize the above transmission control, for example, in the case of the transmitter 2 having the identification number 2 of FIG. 6, the transmission timing may be controlled in the following manner.

First, at the time t1, in the case where the transmitter 2 having the identification number 2 receives a data having identification number 1, subsequently, the transmitter 2 starts a self-transmission data output, and then, completes the self-transmission data output at the time t2. When the transmission is completed, the transmitter 2 having the identification number 2 checks the received data of the reception circuit 16 (see FIG. 2), and thereafter, confirms that no signal interference is generated. Thereafter, the transmitter 2 having the identification number 2 sets the transmission timer counting the next output timing at 3T, and then, starts timer count.

At the time t3, in the case where the transmitter 2 having the identification number 2 receives the remote control data of the identification number 3, the transmitter 2 having the identification number 2 resets the transmission timer at 2T, and then, starts timer count. At the time t4, in the case where the transmitter 2 having the identification number 2 receives the remote control data of the identification number 4, the transmitter 2 having the identification number 2 resets the transmission timer at T, and then, starts timer count.

Thereafter, there is the case where the power of the transmitter 2 having the identification number 1 is turned off, or in the case where the transmitter 2 can not receive the data from the transmitter 2 having the identification number 1 due to noise or the like. In this case, the transmitter 2 having the identification number 2 starts an output of self-data at the point of time when the transmission timer count advances by time T after receiving the data of the identification number 4. Further, in the case where the transmitter 2 having the identification number 2 can not receive the data from other transmitters 2, it can continuously output the transmission data at a period 4T by using the time 3T set in the transmission timer when the self-data transmission is completed.

The above embodiment has described the case where the transmitter 2 is four. By adding the identification number, it is possible to control the transmission timing in the case where the transmitter 2 is five or more, likewise. The period of transmission timing of each transmitter 2 is N×T (N is number of transmitters). In this case, a blank time transmitting no data from any transmitters may be taken between times when each transmitter 2 transmits data, and thereby, the whole period may be set longer than the period NT.

Figure 7:
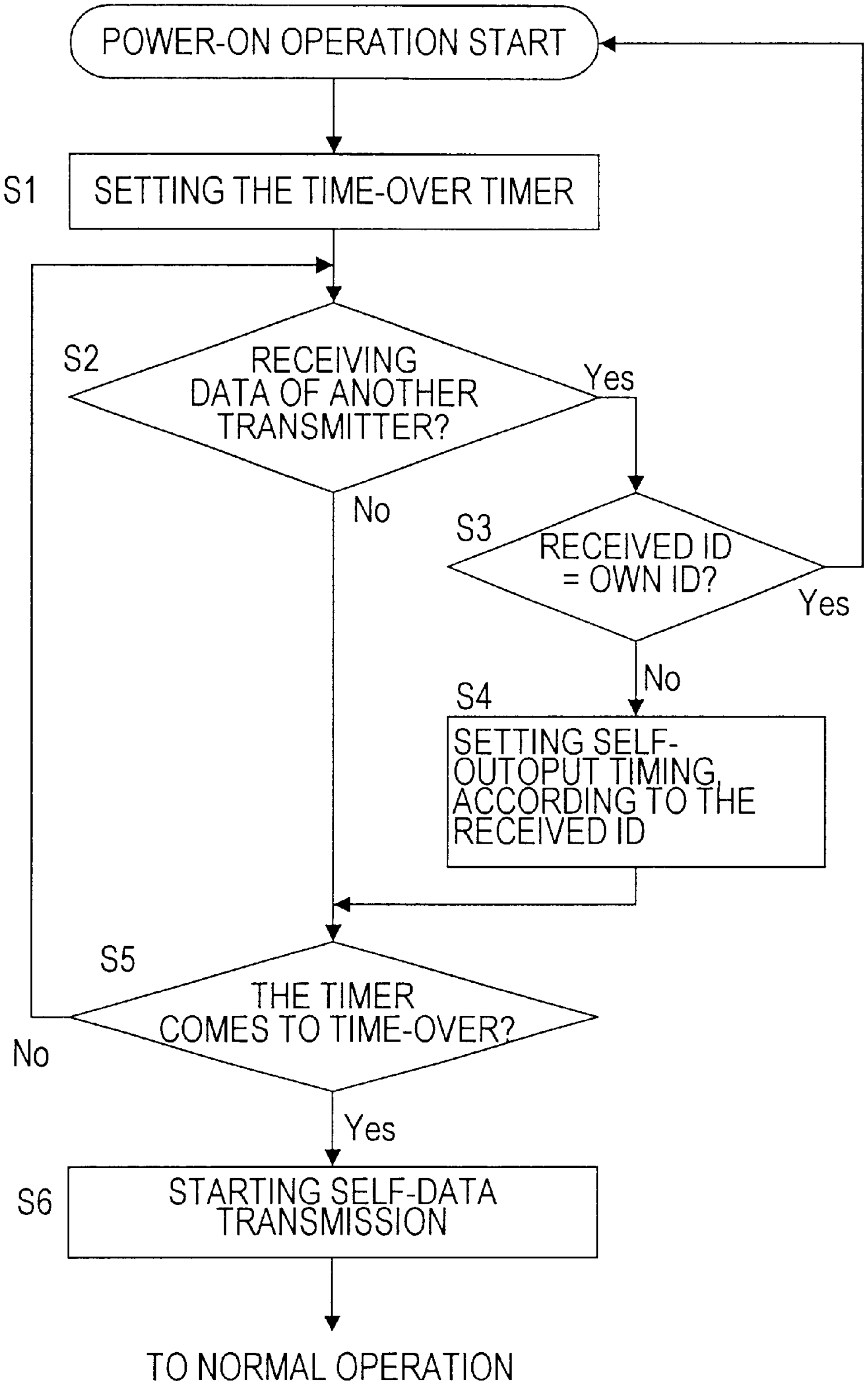

FIG. 7 is a flowchart showing a procedure of power-on operation executed by the control circuit 10 of transmitter 2 until self-data transmission start from power-on. When the power is turned on, first, the control circuit 10 sets a time over timer (step S1). Next, the control circuit 10 makes a decision whether or not the data from other transmitters 2 is received (step S2). If the data is received, the control circuit makes a decision whether or not the identification number of the received data is the same as the identification number set with respect to the self-transmitter 2 (step S3). If the identification number is correspondent, the control circuit 10 returns to step S1, and then, repeats the determining operation. By doing so, it is possible to prevent interference in the case where there exists a plurality of transmitters 2 having the same identification number. If the control circuit 10 makes a decision that the identification number is not correspondent in step S3, the control circuit 10 sets a self-output timing in accordance with the identification number of other transmitters 2 (step S4). For example, if the transmitter 2 having the identification number 2 receives the data of the identification number 3, it sets the self-output timing at 2T.

Subsequently, the control circuit 10 makes a decision whether or not the timer set in step S1 is time over (step S5), and if it is not time over, the control sequence returns to step S2. If the timer is time over, the control circuit starts the self-data transmission (step S6). In this case, the output is actually started at the point of time when the output timing set in step S4 comes. In the case where the data is not received until time over, the transmitter is solely operated; namely, no other transmitters exist, and therefore, data transmission is started at once in step S6.

Figure 8:
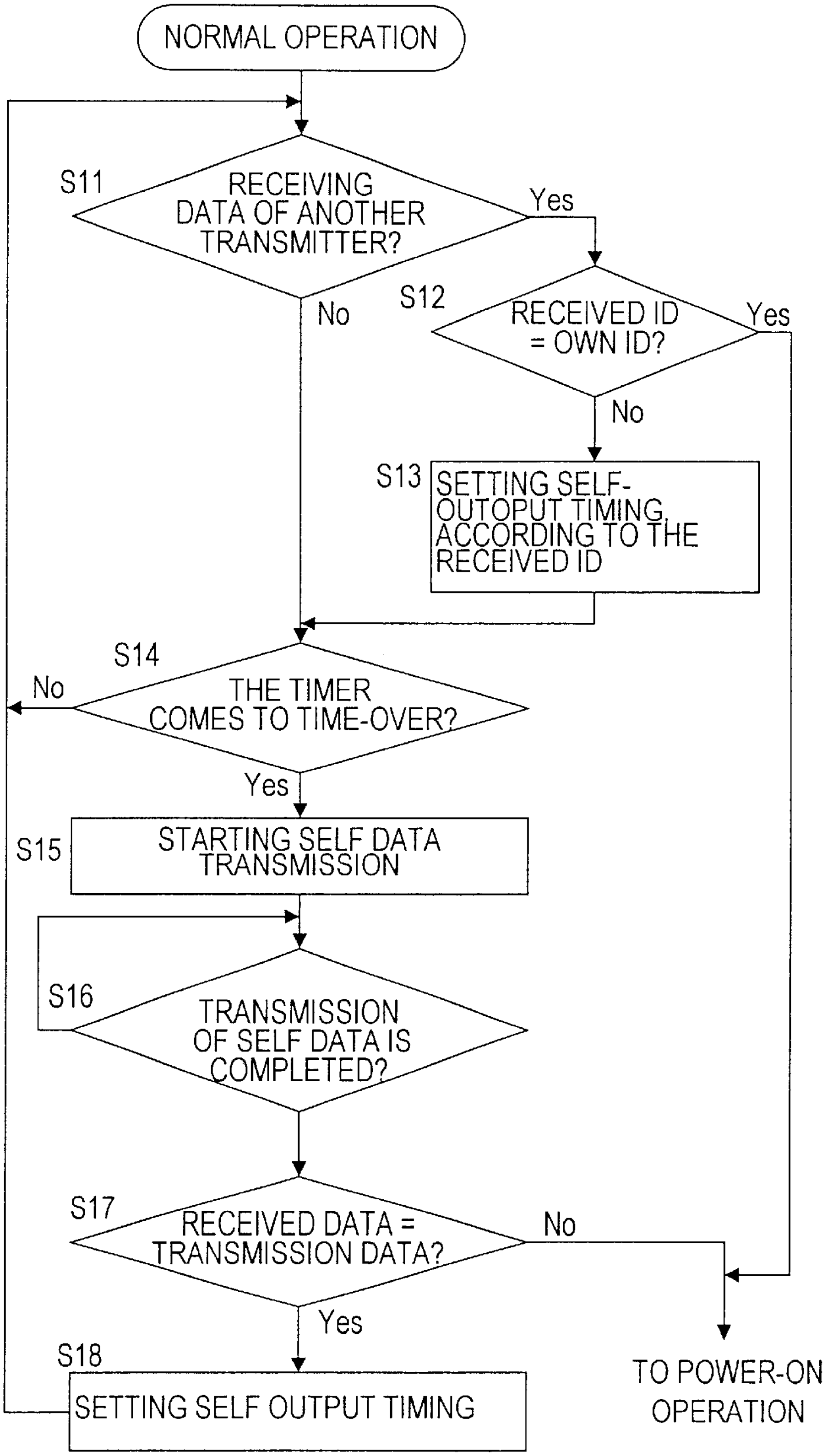
FIG. 8 is a flowchart showing a procedure of normal operation executed by the control circuit of transmitter following the procedure of FIG. 7.

When the processing of step S6 ends, the control circuit 10 controls a data transmission according to the procedure of a normal operation shown in FIG. 8. In the normal operation, first, the control circuit 10 makes a decision whether or not data from other transmitters 2 is received (step S11). If the data is received, the control circuit 10 makes a decision whether or not the identification number of the received data is the same as the identification number set with respect to the self-transmitter 2 (step S12). If the identification number is correspondent, the control sequence returns to the power-on operation shown in FIG. 7. On the other hand, if the identification number of the received data is different from the self-identification number, the control circuit 10 sets the self-output timing to the transmission timer in accordance with the identification number of the received data (step S13). Next, the control circuit makes a decision whether or not the transmission timer reaches time up (step S14), and then, returns to step S1 until the time up comes.

When a decision is made such that the time up comes in step S4, the control circuit 10 starts the self-data transmission (step S15). At that time, the control circuit 10 concurrently receives data. Next, the control circuit 10 makes a decision whether or not the data transmission is completed (step S16). If the data transmission is completed, the control circuit 10 compares the transmitted data with data received concurrently with the transmission (step S17). If the data is not correspondent, a decision is made such that interference is generated, and then, the control sequence proceeds to the power-on operation of FIG. 7. If the data is correspondent, no interference is regarded as being generated, and then, the control circuit 10 set the next output timing to the transmission timer (step S18). Thereafter, the control sequence returns to step S1.

The present invention is not limited to the above embodiment, and various modifications may be made. For example, the driving apparatus is not limited to automobile models, and various mobile models may be used. Further, the transmitter maybe an operator portable type, or may be installed. A specific program is installed in portable (mobile) apparatuses such as a portable game machine and a mobile phone, and then, these apparatuses may be used as a transmitter.

As is evident from the above description, according to the remote control system of the present invention, each transmitter can receive data transmitted from other transmitters, so that the data transmission timing can be set so as not to overlap with each other between transmitters; as a result, it is possible to prevent data interference. By doing so, even in the case where a plurality of transmitters is simultaneously used, it is possible to smoothly operate the driving apparatus corresponding to each transmitter by remote control. Further, by the transmitter and program of the present invention, it is possible to readily realize the remote control system of the present invention.

What is claimed is:

1. A remote control system, which independently operates a plurality of driving apparatuses by remote control using a plurality of transmitters prepared so as to correspond to the driving apparatuses, each of the plurality of transmitters comprising: a data transmission device for transmitting data including identification information peculiar to each transmitter for identifying each transmitter and control information for controlling the driving apparatuses; a reception device for receiving data transmitted from other transmitters; a timing setup device for setting a self-data transmission timing based on the identification information included in the received data; and a transmission control device for making the data transmission device transmit the data according to the set timing, each of the plurality of driving apparatuses comprising: a reception device for receiving transmission data from each transmitter; and a control device for comparing the identification information included in received data with an allocated self-identification information, and carrying out an operation control based on the received data when the data is transmitted to the self as indicated by a positive comparison result between the identification information and the allocated self-identification information.

2. The remote control system according to claim 1, wherein a period when each transmitter is allowed to transmit a data is predetermined so as not to overlap with each other in a predetermined cycle based on the identification information allocated to each transmitter, the timing setup device specifies, when receiving data transmitted from other transmitters, a time remaining until the self-data transmission timing comes in the cycle based on the identification information included in the receiving data, and the transmission control device makes the data transmission device start the data transmission when the specified time elapses.

3. The remote control system according to claim 2, wherein the period when each transmitter is allowed to transmit the data in the predetermined cycle is set to mutually equal time with respect to each transmitter.

4. The remote control system according to claim 2, wherein the timing setup device sets transmission timing of the data so that the self data transmission device repeats data transmission in the predetermined cycle in the case where each transmitter can not receive data from other transmitters.

5. The remote control system according to claim 1, wherein each transmitter includes a hold device, which makes a decision whether or not the identification information included in the data transmitted from other transmitter is the same as the identification information set to the self, and holds, in the case where a decision is made such that both information are the same, a transmission timing setup by the timing setup device until receiving data including an identification information different from the self-identification information.

6. The remote control system according to claim 5, wherein each transmitter includes a transmission data confirming device, which compares a data transmitted at the timing set by the timing setup device with a data received concurrently with the transmission, and makes the hold device carry out a procedure when both data are not correspondent.

7. A transmitter for remote control system, which is prepared for each of driving apparatuses to independently operate the driving apparatuses by remote control, comprising: a data transmission device for transmitting data including identification information peculiar to the transmitter and control information for controlling the driving apparatus; a reception device for receiving data transmitted from other transmitters; a timing setup device for setting a self-data transmission timing based on the identification information included in the received data; and a transmission control device for making the data transmission device transmit the data according to the set timing.

8. The transmitter according to claim 7, wherein a period when the transmitter is allowed to transmit a data is predetermined in a predetermined cycle based on the identification information, the timing setup device specifies, when receiving data transmitted from other transmitters, a time remaining until the self-data transmission timing comes in the cycle based on the identification information included in the receiving data, and the transmission control device makes the data transmission device start the data transmission when the specified time elapses.

9. The transmitter according to claim 8, wherein the period when the transmitter is allowed to transmit the data in the predetermined cycle is set to a time equal to time transmitting data with respect to other transmitters.

10. The transmitter according to claim 8, wherein the timing setup device sets transmission timing of the data so that the self data transmission device repeats data transmission in the predetermined cycle in the case where each transmitter can not receive data from other transmitters.

11. The transmitter according to claim 7, further including: a hold device, which makes a decision whether or not the identification information included in the data transmitted from other transmitter is the same as the identification information set to the self, and holds, in the case where a decision is made such that both information are the same, a transmission timing setup by the timing setup device until receiving data including an identification information different from the self-identification information.

12. The transmitter according to claim 11, further including: a transmission data confirming device, which compares a data transmitted at the timing set by the timing setup device with a data received concurrently with the transmission, and makes the hold device carry out a procedure when both data are not correspondent.

13. A remote control system program controller product to be used for a transmitter, which includes a data transmission device for transmitting data including identification information peculiar to the transmitter and control information for controlling a driving apparatus, a reception device for receiving data transmitted from other transmitters, and a computer for controlling data transmission based on the received data, and which is prepared for each of driving apparatuses to independently operate the driving apparatuses by remote control, the program being constructed to allow the computer to serve as: a timing setup device for setting a self-data transmission timing based on the identification information included in the data received by the reception device; and a transmission control device for making the data transmission device transmit the data according to the set timing.

14. The remote control system program controller product according to claim 13, wherein a period when the transmitter is allowed to transmit a data is predetermined in a predetermined cycle based on the identification information, the timing setup device specifies, when receiving data transmitted from other transmitters, a time remaining until the self-data transmission timing comes in the cycle based on the identification information included in the receiving data, and the transmission control device makes the data transmission device start the data transmission when the specified time elapses.

15. The remote control system program controller product according to claim 14, wherein the period when the transmitter is allowed to transmit the data in the predetermined cycle is set to a time equal to time transmitting data with respect to other transmitters.

16. The remote control system program controller product according to claim 14, wherein the timing setup device sets transmission timing of the data so that the self data transmission device repeats data transmission in the predetermined cycle in the case where each transmitter can not receive data from other transmitters.

17. The remote control system program controller product according to claim 13, wherein the program is constructed to allow the computer to serve further as a hold device, which makes a decision whether or not the identification information included in the data transmitted from other transmitter is the same as the identification information set to the self, and holds, in the case where a decision is made such that both information are the same, a transmission timing setup by the timing setup device until receiving data including an identification information different from the self-identification information.

18. The remote control system program controller product according to claim 17, wherein the program is constructed to allow the computer to serve further as a transmission data confirming device, which compares a data transmitted at the timing set by the timing setup device with a data received concurrently with the transmission, and makes the hold device carry out a procedure when both data are not correspondent.

19. A computer readable storage medium recording a program to be used for a transmitter, which includes a data transmission device for transmitting data including identification information peculiar to the transmitter and control information for controlling the driving apparatus, a reception device for receiving data transmitted from other transmitters, and a computer for controlling data transmission based on the received data, and which is prepared for each of driving apparatuses to independently operate the driving apparatuses by remote control, the program being constructed to allow the computer to serve as: a timing setup device for setting a self-data transmission timing based on the identification information included in the data received by the reception device; and a transmission control device for making the data transmission device transmit the data according to the set timing.

* * * * *